Feb. 17, 1953 E. A. STALKER 2,628,793
AUTOMATIC AND MANUAL CONTROL OF AIRCRAFT
Filed Oct. 3, 1946 2 SHEETS—SHEET 1
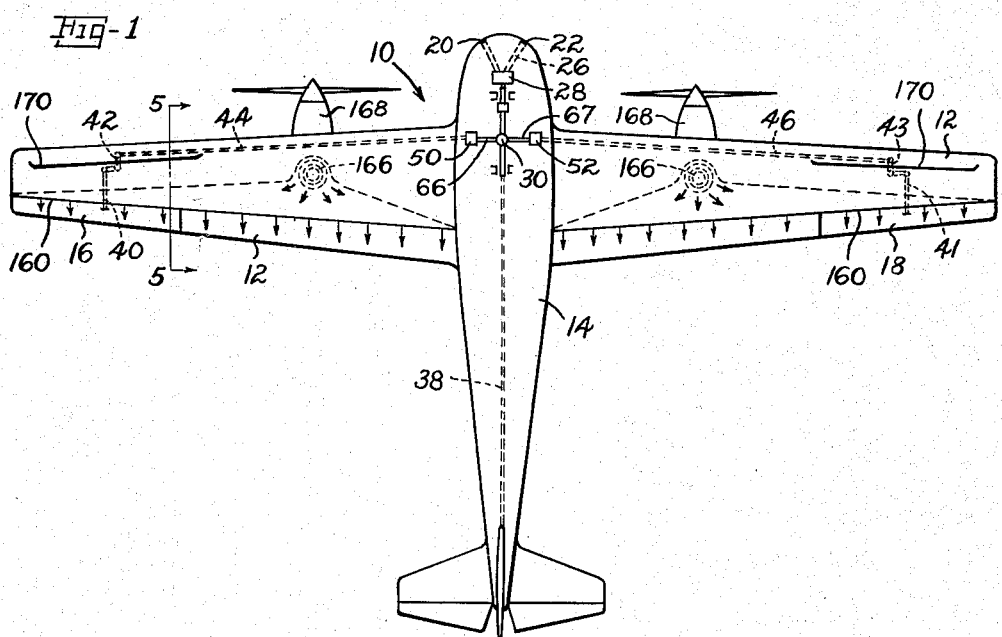
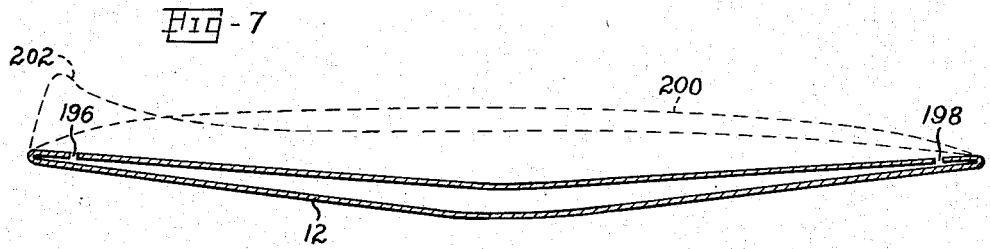
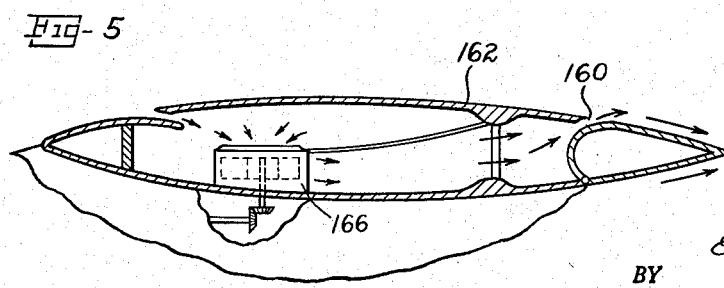
INVENTOR.
Edward A. Stalker
BY
Marechal & Biebel
ATTORNEYS Feb. 17, 1953 E. A. STALKER 2,628,793
AUTOMATIC AND MANUAL CONTROL OF AIRCRAFT
Filed Oct. 3, 1946 2 SHEETS—SHEET 2
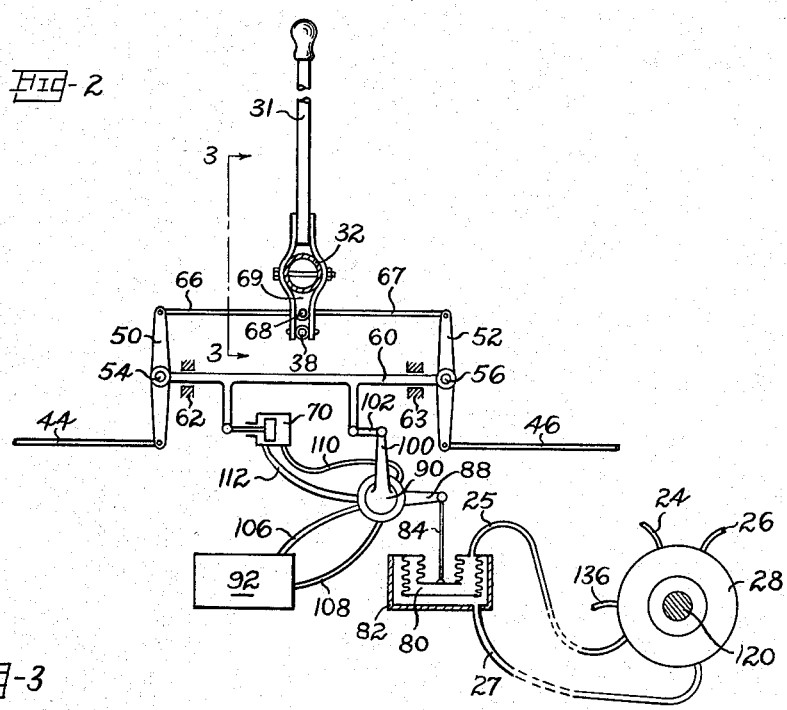
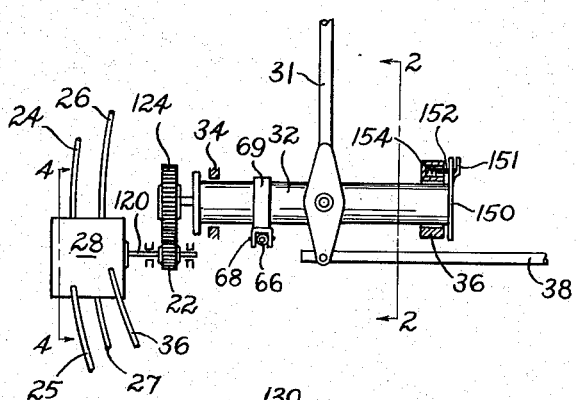
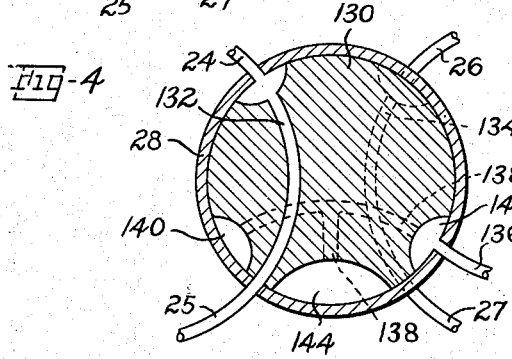
INVENTOR.
Edward A. Stalker
BY
Marechal & Biebel
ATTORNEYS Patented Feb. 17, 1953

2,628,793

UNITED STATES PATENT OFFICE 2,628,793

AUTOMATIC AND MANUAL CONTROL OF AIRCRAFT

Edward A. Stalker, Bay City, Mich.

Application October 3, 1946, Serial No. 701,024

3 Claims. (Cl. 244—78)

This invention relates to aircraft and more particularly to means of automatically controlling such craft.

An object of the invention is to provide a control system for an aircraft which operates automatically in response to the relative wind condition and restores the aircraft to a balanced condition of flight from an unbalanced condition in which side slip is present.

Another object of this invention is to provide means automatically controlling a flight control function of the aircraft whose operation is interrupted or disabled when the steering control is moved away from its neutral position.

Other objects and advantages will appear from the following description, the accompanying drawings and the appended claims.

In the drawings

Fig. 1 is a fragmentary top plan view of an aircraft constructed in accordance with the present invention;

Fig. 2 is a fragmentary schematic view of the control mechanism looking forward from the pilot's position;

Fig. 3 is a fragmentary view of the control mechanism looking laterally on line 3—3 in Fig. 2;

Fig. 4 is a section through the valve case along the line 4—4 of Fig. 3;

Fig. 5 is a vertical section and fragmentary view through the wing along line 5—5 of Fig. 1;

Fig. 6 is a top plan view of a wing; and

Fig. 7 is a section along line 7—7 of Fig. 6 with the air pressure distribution thereon indicated for two conditions of flight.

When an airplane is flying along a straight course and it is rolled by some disturbing force, the dihedral angle in the wings brings into play a restoring moment which returns the airplane to level flight if the stick or steering control is in lateral neutral. If, however, the pilot banks the airplane and pursues a curved flight path, the airplane will not return to a level position of the wings when the stick is neutralized but will continue to fly in a curve.

Furthermore, if the pilot has not selected the correct degree of bank corresponding to the radius of the curved path and the flight speed, the airplane may side-slip toward the center of the curve. If the airplane is directionally stable as is desirable, the side-slip will turn the nose of the airplane toward the center of the curve, and this process will continue progressively leading to the well-known spiral instability which may be disastrous, a condition very likely to occur if the pilot is unable to see the horizon because of inclement weather.

The aircraft according to this invention will automatically return to a proper condition of flight when the pilot ceases forcing the airplane into the maneuver. Thus, if the pilot forces the airplane to make a turn with or without sideslip, the airplane will return to a level attitude for the span of the wings as soon as he ceases to force this maneuver by returning the stick to neutral. The attitude of the aircraft longitudinally may be anything desired as this has no effect on the proper functioning of the present invention.

When an airplane is banked as in a turn, neutralizing the pilot's stick does not restore the airplane to a horizontal attitude. The stick must be moved off center and then neutralized just before the wings are horizontal. The stick must be neutralized ahead of recovery because of the inertia of the aircraft about the longitudinal axis. This maneuver is difficult to learn, but of even greater importance is the inability of a skilled pilot to properly right the aircraft when the horizon is not visible.

This invention discloses a simple automatic means of righting the aircraft when the stick or other control is returned to neutral which functions without reference to the horizon and which does not require the maneuver as above described.

In the drawings the airplane is shown generally at 10 having the wings 12 and fuselage 14. The wings are equipped with flaps 16 and 18 for varying the lift of the wings.

In the nose surface of the fuselage are the holes 20 and 22 which are thus located in a position spaced a substantial distance from the center of gravity of the aircraft and at points with respect to which there is a substantial difference of velocity of the relative wind during the turning of the aircraft so as to be sensitive to such turning. Tubes 24 and 26 connect each hole respectively to opposite sides of the pressure responsive device 30 which can move the flaps differentially in response to a difference of air pressure between the two holes. This provides a control which is sensitive to dissimilar pressures at the nose of the plane, and thus to a condition of directional instability, which changes the lift of the wings differentially and in the proper direction to right the aircraft as long as the holes are subject to such dissimilar pressures.

The pilot controls the airplane by means of the stick 31 which is tiltable laterally about the axis of the tube 32 supported in bearings 34 and 36 for actuating the elevator. The tube 38 extends rearward from the lower end of the stick to actuate the elevator. The ailerons 16 and 18 are moved by the arms 40 and 41 actuated by bellcranks 42 and 43, rods 44 and 46, the latter attaching to the parallel levers 50 and 52 respectively. These levers are rotatably supported at centers 54 and 56 on the support rod 60 which can slide laterally in the bearings 62 and 63. The upper ends of the levers 50 and 52 are connected by the links 66 and 67, and pin 68 to the arm 69 on the torque tube 32.

In straight flight the centers 54 and 56 of the levers 50, 52 are maintained in a centered position by the jack 70 connected to the support rod 60 and under the control of the pressures from the holes 20 and 22 in the fuselage nose. Then operation of the stick laterally moves the ailerons to roll the airplane. As will be described subsequently when the stick is moved laterally off neutral, the pressures from holes 20 and 22 are unable to influence the aileron movement because valve 28 is closed to their flow.

If the stick is in neutral the pressures from the holes 20 and 22 reach the bellows 80 which has an annular cross-section. The pressure from tube 22 enters the air-tight casing 82 in which the bellows are sealed while the pressure from tube 20 enters the interior of the bellows. A difference in pressure will therefore cause the bellows to move rod 84 articulated to movable arm 88 of follow-up valve 90. This valve controls the flow of fluid under pressure from a source 92 to the jack 70. A suitable type of valve for this purpose is a Vickers' two stage metering valve, drawing EOCY 10920.

The valve has a follow-up arm 100 connected by the link 102 to the sliding support rod 60 of the levers 50 and 52. Upon movement of valve arm 88 with respect to the valve casing 90, the valve ports are opened and fluid pressure is supplied to cause operation of the jack 70. This motion of the jack is transmitted through the sliding support rod 60, link 102 and follow-up arm 100 which causes a corresponding rotation of the valve casing 90, such movement continuing until the casing resumes its original relationship relative to the valve arm 88. Thus the support rod is moved an amount directly determined by the movement of valve arm 88, and in this position the support rode comes to rest. The movement of the support rod causes a deflection of the ailerons to correct for the yaw giving rise to the difference in pressure at the holes 20 and 22. When the yaw is corrected for, the pressures at 20 and 22 become equal and the jack returns the support rod 60 to its neutral position. The valve 90 passes the fluid to and from the source 92 to and from the jack 70 via tubes 106, 108, 110 and 112.

The valve 28 serves to interrupt or to disable the automatic action which arises from a difference in pressure at the holes 20 and 22. It is desired that this automatic action take place only when the stick is in neutral so that when the stick is moved the control is entirely manual.

The stem 120 of the valve 28 (Fig. 3) is rotatable by gear 122 fixed to it. This gear is turned by the mating gear 124 on the torque tube 32. The gear 124 is larger than valve gear 122 so that only a small angular movement of the stick is necessary to close the valve to the flow of pressure therethrough. When the stick is in neutral fluid pressure from the hole 20 is transmitted through the valve to tube 25 and to the interior of bellows 80, while pressure from 22 is transmitted to tube 27 and to the exterior of bellows 80.

The cylindrical valve 28 is shown in Fig. 4. The rotatable valve cylinder 130 has the passage 132 whose ends register with the openings into tubes 24 and 25. The passage 134 is displaced axially rearward from passage 132 and registers with the openings of tubes 26 and 27. A rotation of the cylinder either way shuts off communication of tubes 25 and 27 with tubes 24 and 26 and instead establishes communication of both tubes 25 and 27 with tube 136 open to the atmosphere. This communication to the atmosphere is established through the branched passage 138 and the recesses 140, 142 and 144.

When the pilot moves the stick from neutral, the flow of pressure from the holes 20 and 22 is shut off and instead both sides of the bellows 80 are opened to the same pressure via tube 136 and rod 60 is then under direct manual control.

Thus if the airplane is side slipping and the pilot wishes to assume control or wishes a stronger restoring moment than the automatic device will give, he moves the stick to get this stronger moment and the bias of the ailerons due to the automatic device is eliminated. Thus the manual control, when operated, always has the same restoring effect relative to the degree of displacement of the stick.

Under automatic operation, when the airplane is flying directly into the wind the pressures at the two holes are equal and no movement of the flaps is called forth. When the airplane is turned directionally the flow of air will be off center of the fuselage and there will be a difference in pressure at the two holes. As long as the stick is off neutral the device is cut off from the two holes and no automatic change in control results. However, when the stick (or other manual steering control) is neutralized, the pressures from the holes will produce a response which moves the flap differentially to roll the airplane back to the horizontal position.

The tube 32 has fixed to it at one end a detent comprising a plate 150 which has a small depression 151 at one spot into which a pin with a spherical end can fit. The pin 152 is pushed toward the plate by the spring 154. The pin registers with the depression when the stick is in neutral and the pilot can tell that the stick is neutralized by the slight resistance to lateral movement of the stick. The resistance is readily overcome when the pilot pushes laterally on the stick.

If the airplane is side slipping, not only should the lift on the low wing be increased but there should be a yawing moment tending to force the low wing forward. Normally an increase of lift is accompanied by an increase in drag, the induced drag which arises with an increase of lift. If a yawing moment tending to push the low wing forward is not present the airplane will be turned in yaw in the wrong direction which will endanger the airplane.

In accordance with this invention a depression of the aileron, such as 16, enlarges the slot 160 (Fig. 5) between the upper surface of the aileron and the wing main body surface 162 so that a greater jet of air is discharged to produce a thrust. Such an aileron and wing main body construction is disclosed in my U. S. Patent No. 2,406,919 dated September 3, 1946. The jet for the wing slot is supplied by the blower 166 suitably driven from the engine in the nacelle 168, The air for the blower is inducted through slot 170.

Another method of creating a favorable yawing moment would be the use of a drag producing element projected into the relative wind by the up aileron such as a spoiler.

The air pressure openings can also be located on other parts of the aircraft besides the fuselage. For instance, an advantageous place is near the tips of the wing, the wing being considered in this invention as including the lifting surfaces between the wing tips on opposite sides of the fuselage or longitudinal center line of the aircraft. The openings in this case are displaced laterally a substantial amount with respect to the center of gravity of the aircraft in which position they are similarly sensitive to the turning of the aircraft. Further, the openings may be made responsive to the direction of the relative wind as well as to its pressure.

As shown in Figs. 6 and 7, the tubes 24' and 26' lead to spanwise spaced holes 196 and 198 in the upper surface of the wing and to the same connections on valve 28 as the tubes 24 and 26. In normal straight flight the pressure distribution along a spanwise line 7—7 is shown by curve 200 while if the airplane is side-slipping, the pressure distribution is shown by curve 202. In the latter case the windward tip edge of the wing acts like a leading edge and increases the suction above the wing. The change in pressure difference between the two holes actuates the bellows 80 and associated mechanism as previously described.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination in an aircraft having a supporting wing with means to vary the lift thereof differentially on opposite sides of the aircraft, the combination of a manual steering control having a neutral position and adjustable away from said neutral position to effect a change in said lift varying means, a device responsive to a change in the direction of the relative wind, a power actuating element under control of said wind direction device and connected to said lift varying means for selective variation thereof to maintain stability of the aircraft with said manual control in said neutral position, means operably interconnected with said manual steering control and with said wind direction device and operable in response to movement of said manual control away from said neutral position for disabling the control by said wind direction device rendering said power actuating means inoperative, and means interconnecting said manual control with said lift varying means in parallel with said connection between said power actuating element and said lift varying means for direct actuation of said lift varying means by said manual control independently of said power actuating element.

2. In combination in an aircraft having a supporting wing with means to vary the lift thereof differentially on opposite sides of the aircraft, a lever for effecting movement for said lift varying means, a power actuating means connected at one point to said lever, a manual control having a neutral position and connected at another point to said lever, a device responsive to a change in the direction of the relative wind, automatic means connected to said power actuating means and controlled by said relative wind direction device for effecting movement of said lever to adjust said lift varying means with said manual control remaining in said neutral position, and means connected to said manual control for disabling said automatic means in response to movement of said manual control away from said neutral position for direct movement of said lever by manual operation independently of said automatic control.

3. In combination in an aircraft having a supporting wing with means to vary the lift thereof differentially on opposite sides of the aircraft, a lever for effecting movement for said lift varying means, a power actuating means connected at one point to said lever, a manual control having a neutral position and connected at another point to said lever, a device responsive to a change in the direction of the relative wind, automatic means connected to said power actuating means and controlled by said relative wind direction device for effecting movement of said lever about the connection point with said manual control as a pivot to adjust said lift varying means with said manual control remaining in said neutral position, and means connected to said manual control for disabling said automatic means in response to movement of said manual control away from said neutral position for direct movement of said lever by manual operation about the connection point with said power actuating means as a pivot independently of said automatic control.

EDWARD A. STALKER.

REFERENCES CITED

The following references are of record in the file of this patent:

UNITED STATES PATENTS

| Number | Name | Date |
|---|---|---|
| 1,956,755 | Constantin | May 1, 1934 |
| 1,972,336 | Gardner | Sept. 4, 1934 |
| 2,029,700 | Boykow | Feb. 4, 1936 |
| 2,343,288 | Fink | Mar. 7, 1944 |
| 2,394,384 | Horstmann | Feb. 5, 1946 |
| 2,420,932 | Cornelius | Mar. 20, 1947 |
| 2,464,629 | Young | Mar. 15, 1949 |
| 2,471,821 | Kutzler | May 31, 1949 |
| 2,499,471 | Dunning | Mar. 7, 1950 |